(12) United States Patent
Yoshida et al.

(10) Patent No.: US 10,821,758 B2
(45) Date of Patent: Nov. 3, 2020

(54) ILLUMINATION DEVICE, LINE SENSOR ASSEMBLY, READING APPARATUS, AND PRINTING APPARATUS

(71) Applicant: CANON COMPONENTS, INC., Saitama-ken (JP)

(72) Inventors: Hidemasa Yoshida, Saitama-ken (JP); Takeshi Sugiyama, Saitama-ken (JP)

(73) Assignee: CANON COMPONENTS, INC., Saitama (JP)

( * ) Notice: Subject to any disclaimer, the term of this patent is extended or adjusted under 35 U.S.C. 154(b) by 35 days.

(21) Appl. No.: 16/205,733

(22) Filed: Nov. 30, 2018

(65) Prior Publication Data

US 2019/0168525 A1 Jun. 6, 2019

(30) Foreign Application Priority Data

Dec. 5, 2017 (JP) .................................. 2017-233614
Nov. 16, 2018 (JP) .................................. 2018-215757

(51) Int. Cl.
| | |
|---|---|
| *B41J 29/393* | (2006.01) |
| *G03G 15/22* | (2006.01) |
| *G01J 1/42* | (2006.01) |
| *G03G 15/00* | (2006.01) |
| *F21V 8/00* | (2006.01) |
| *G01J 1/04* | (2006.01) |
| *H04N 1/00* | (2006.01) |

(52) U.S. Cl.
CPC .......... *B41J 29/393* (2013.01); *G01J 1/0411* (2013.01); *G01J 1/0425* (2013.01); *G01J 1/42* (2013.01); *G02B 6/001* (2013.01); *G03G 15/221* (2013.01); *H04N 1/00* (2013.01); *G03G 15/607* (2013.01)

(58) Field of Classification Search
CPC ...... B41J 29/393; G01J 1/0411; G01J 1/0425; G01J 1/42; G02B 6/001; G03G 15/221; G03G 15/607; H04N 1/00; H04N 1/00559; H04N 1/02835; H04N 1/02885
USPC ........................................ 358/475, 509, 474
See application file for complete search history.

(56) References Cited

U.S. PATENT DOCUMENTS 7,129,472 B1 * 10/2006 Okawa ............... A61B 1/00059
250/234
7,238,935 B2 * 7/2007 Asada ....................... G01J 1/58
250/216

(Continued)

FOREIGN PATENT DOCUMENTS

JP 2001332114 A 11/2001
JP 2003077324 A 3/2003

(Continued)

*Primary Examiner* — Negussie Worku
(74) *Attorney, Agent, or Firm* — Rossi, Kimms & McDowell LLP (57) ABSTRACT

There is provided with an illumination device. The illumination device has a circuit board; a light source movable relative to the circuit board; a rod-like light guide that is configured to guide light from the light source and that is elongated in a longitudinal direction; and a flexible wiring configured to supply electricity from the circuit board to the light source. The light source is capable of moving in the longitudinal direction to reduce fluctuation in distance between the light source and a light receiving surface of the light guide when an end portion of the light guide in the longitudinal direction moves in the longitudinal direction.

18 Claims, 3 Drawing Sheets

(56) References Cited

U.S. PATENT DOCUMENTS

| | | | | |
|---|---|---|---|---|
| 8,189,967 | B1* | 5/2012 | Olson | F41G 1/35 |
| | | | | 385/12 |
| 8,345,331 | B2* | 1/2013 | Ikeda | H04N 1/00795 |
| | | | | 358/1.9 |
| 8,905,591 | B2* | 12/2014 | Okamoto | H04N 1/0083 |
| | | | | 362/249.02 |
| 9,077,835 | B2* | 7/2015 | Ozawa | H04N 1/04 |
| 9,151,470 | B2* | 10/2015 | Amemiya | F21V 13/04 |
| 9,325,874 | B2* | 4/2016 | Tanaka | H04N 1/02835 |
| 9,930,204 | B2* | 3/2018 | Takahashi | H04N 1/0289 |
| 10,401,579 | B2* | 9/2019 | Sakurai | G02B 6/4204 |
| 2002/0054387 | A1* | 5/2002 | Yokota | H04N 1/02835 |
| | | | | 358/509 |
| 2008/0316547 | A1* | 12/2008 | Kim | H04N 1/0083 |
| | | | | 358/474 |
| 2010/0157395 | A1* | 6/2010 | Ikeda | H04N 1/00795 |
| | | | | 358/505 |
| 2016/0057308 | A1* | 2/2016 | Tanaka | H04N 1/02835 |
| | | | | 358/475 |
| 2016/0234445 | A1* | 8/2016 | Shimoda | H04N 5/332 |
| 2019/0268495 | A1* | 8/2019 | Otake | H04N 1/0249 |

FOREIGN PATENT DOCUMENTS

| | | |
|---|---|---|
| JP | 2007251353 A | 9/2007 |
| JP | 2009094935 A | 4/2009 |

* cited by examiner

ILLUMINATION DEVICE, LINE SENSOR ASSEMBLY, READING APPARATUS, AND PRINTING APPARATUS

BACKGROUND OF THE INVENTION

Field of the Invention

This invention relates to an illumination device, a line sensor assembly, a reading apparatus, and a printing apparatus.

Description of the Related Art

An illumination device for a reading apparatus that uses a line sensor, which irradiates a linear irradiation region with light from a point light source using a rod-like light guide, is known. For example, Japanese Patent Laid-Open No. 2009-94935 discloses emitting light from a light source on a light source substrate connected to a main circuit board toward an end portion of a rod-like light guide that is attached to a case.

SUMMARY OF THE INVENTION

According to an embodiment of the present invention, an illumination device comprises a circuit board, a light source movable relative to the circuit board, a rod-like light guide that is configured to guide light from the light source and that is elongated in a longitudinal direction, and a flexible wiring configured to supply electricity from the circuit board to the light source, wherein the light source is capable of moving, in the longitudinal direction to reduce fluctuation in distance between the light source and a light receiving surface of the light guide when an end portion of the light guide in the longitudinal direction moves in the longitudinal direction.

Further features of the present invention will become apparent from the following description of exemplary embodiments with reference to the attached drawings.

DESCRIPTION OF THE EMBODIMENTS

The distribution of light emitted through a light guide is dependent on the distance between the light guide and a light source. Therefore, it is desirable to reduce fluctuation in the distance between the light guide and the light source in order to reduce fluctuation in the distribution of the amount of light from an illumination device. Since the light guide gets longer or shorter due to temperature change, there is still room for improvement in reduction of fluctuation in the distance between the light guide and the light source.

According to an embodiment of the present invention, fluctuation in the distance between a light source and a light receiving surface of a rod-like light guide is reduced in an illumination device that emits light from the light source through the light guide.

The following describes embodiments of the present invention with reference to the accompanying drawings. However, the scope of the present invention is not limited to the embodiments described below. An illumination device according to an embodiment of the present invention can be used in a line sensor assembly. The following describes a line sensor assembly according to an embodiment of the present invention, which includes an illumination device according to an embodiment of the present invention, a lens array, a line sensor, and a frame.

Figure 1:
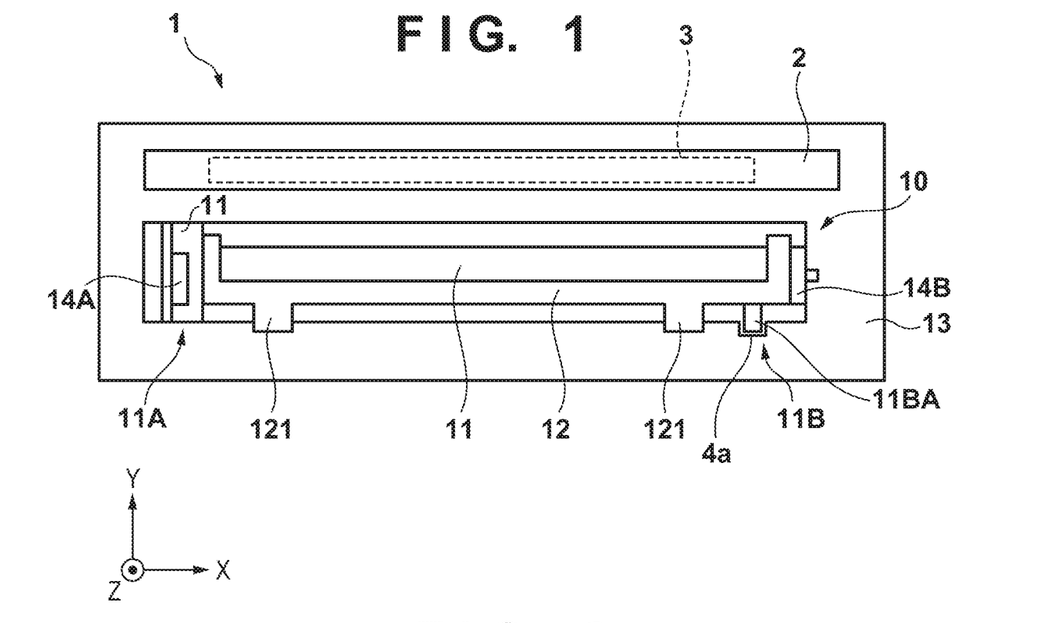
FIG. 1 is a top view of a line sensor assembly that includes an illumination device according to an embodiment.

FIG. 1 is a top view schematically illustrating an overall structure of a line sensor assembly 1 according to an embodiment. For ease of understanding of the structure, an X direction, a Y direction, and a Z direction orthogonal to one another are indicated in the drawing. The line sensor assembly 1 has an elongated structure extending in the X direction. In the present specification, the X direction is also referred to as a longitudinal direction. The Z direction corresponds to a height direction of the line sensor assembly 1. The line sensor assembly 1 is capable of reading an image of a reading target located on a positive side in the Z direction as seen from the line sensor assembly 1. The Y direction corresponds to a width direction of the line sensor assembly 1. Although the reading target is not particularly limited, the reading target is for example a recording medium having a flat surface with characters or an image formed thereon, such as a document or a magazine.

As illustrated in FIG. 1, the line sensor assembly 1 includes an illumination device 10, a lens array 2, a line sensor 3, and a frame 4. The illumination device 10 has a shape extending in the X direction and is capable of irradiating an irradiation region extending in the X direction on the reading target with light all at once. The illumination device 10 emits light toward the reading target through a light guide 11 from light sources 14A and 14B located in end portions, at respective positions on the illumination device 10 in the X direction. In an embodiment, the light includes light of a visible light wavelength. The light may include not only visible rays but also X rays, ultraviolet rays, or infrared rays. In another embodiment, the light may be any one of, two or more of, or all of X rays, ultraviolet rays, and infrared rays.

The lens array 2 collects light emitted from the illumination device 10 toward the reading target and guides the light to the line sensor 3. The lens array 2 has a shape extending in the X direction and is capable of collecting light from the irradiation region extending in the X direction on the reading target all at once. The lens array 2 may for example be a rod lens array composed of rod lenses extending in the Z direction and arranged along with the X direction. In the example of FIG. 1, the lens array 2 is spaced apart from the illumination device 10 in the Y direction and is fixed to the frame 4.

The line sensor 3 detects the light collected by the lens array 2. The line sensor 3 has a shape extending in the X direction and is capable of reading the light collected by the lens array 2 all at once. A known photoelectric conversion element such as a CMOS image sensor can for example be used as the line sensor 3. In the example of FIG. 1 the line sensor 3 is spaced apart from the lens array 2 on a negative side in the Z direction and is fixed to the frame 4.

The frame 4 is capable of holding and accommodating the illumination device 10, the lens array 2, and the line sensor 3. The configuration of the frame 4 is not particularly limited. The frame 4 can have a shape extending in the X direction as illustrated in FIG. 1. In an embodiment, the frame 4 has a black surface or is made of a black material in order to prevent noise from being generated by light being diffusely reflected at a surface of the frame 4 and reaching the line sensor 3.

The configuration of the line sensor assembly 1 is not limited to that illustrated in FIG. 1. For example, the line sensor assembly 1 may include a first frame provided with the illumination device 10 and a second frame provided with the lens array 2 and the line sensor 3. In this case, the first frame and the second frame may be disposed to sandwich the reading target therebetween. In this configuration, the line sensor 3 can detect light that was emitted from the illumination device 10, passed through the reading target, and was collected by the lens array 2.

Figure 2:
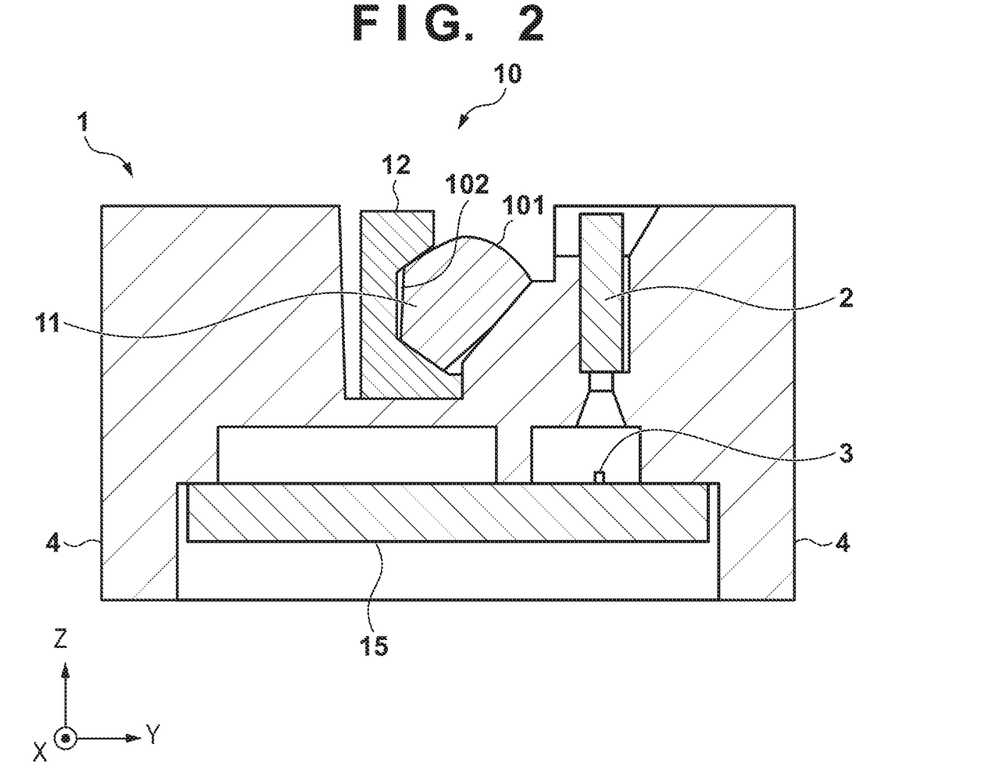
FIG. 2 is a sectional view of a line sensor assembly that includes an illumination device according to an embodiment.

The following describes the illumination device according to the present embodiment in detail with reference to FIGS. 1 and 2. FIG. 2 is a sectional view of the elongated illumination device 10 according to the embodiment taken along a plane (Y-Z plane) perpendicular to the longitudinal direction at approximately the center of the illumination device 10 in the longitudinal direction.

The illumination device 10 according to the present embodiment includes a circuit board 15, the light source 14A that is movable relative to the circuit board 15, the rod-like light guide 11 that guides light from the light source 14A, and a flexible wiring 16A that supplies electricity from the circuit board 15 to the light source 14A.

The circuit board 15 is capable of supplying electricity supplied from the outside of the illumination device 10 to the light source 14A via the flexible wiring 16A. Also, a signal for controlling light emission from the light source 14A may be supplied from the circuit board 15 to the light source 14A via the flexible wiring 16A. Further, the circuit board 15 may supply electricity or a control signal to the light source 14B described later via another wiring 16B. In an embodiment, the circuit board is fixed to the frame. In the example of FIG. 2, the circuit board 15 is held by the frame 4. In this example, a surface of the circuit board 15 abuts on the frame 4. The circuit board 15 may be further connected to the line sensor 3 as illustrated in FIG. 2. In the example of FIG. 2, the line sensor 3 is located on a surface, i.e., an upper surface of the circuit board 15, and the circuit board 15 is fixed to the frame 4. In this case, the circuit board 15 can supply a signal for controlling operation of the line sensor 3 to the line sensor 3, and receive a signal indicating a detection result of the line sensor 3 and supply the signal to the outside of the illumination device 10.

The type of the circuit board 15 is not particularly limited. The circuit board 15 may for example be a printed circuit board. Also, the circuit board 15 may be either a rigid board or a flexible board. The circuit board 15 may include an electrical element and/or a processing unit for performing signal processing or control processing.

The light source 14A is capable of emitting light. The light source is for example composed of LEDs or the like, but is not particularly limited. The illumination device 10 may include two or more light sources. In the example of FIG. 1, the illumination device 10 includes the light source 14A and the light source 14B.

The light guide 11 is a rod-like light guide that is elongated in the longitudinal direction, i.e., extends in the longitudinal direction. Light can pass through the inside of the light guide 11. The light guide 11 may for example be a transparent member made of a transparent material such as polyacrylates.

Figure 3:
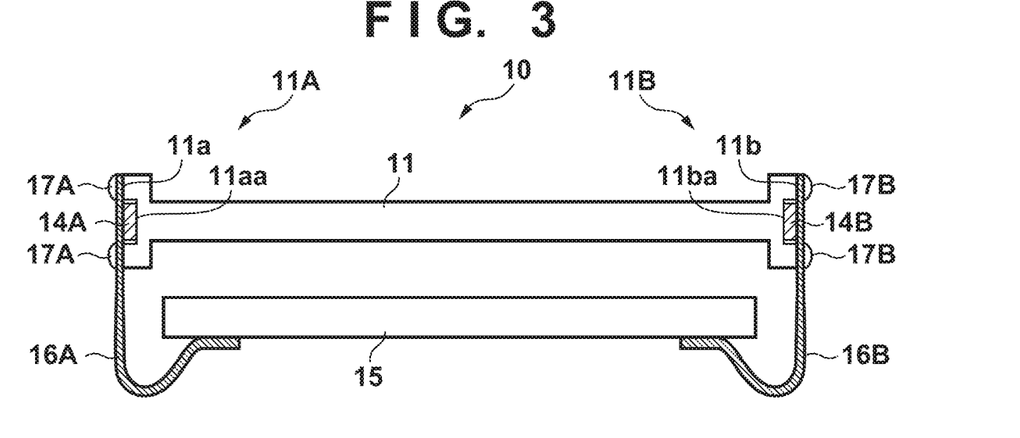
FIG. 3 is a schematic diagram of an illumination device according to an embodiment.

The light guide 11 has a light receiving surface through which light from the light source 14A enters. In the example of FIG. 3, the light guide 11 has a first light receiving surface through which light from the light source 14A enters. The first light receiving surface is located in a first end portion 11A of the light guide 11 in the longitudinal direction and may for example be an end face 11a of the light guide 11 in the longitudinal direction. The light guide 11 may have an additional light receiving surface through which light from an additional light source enters. In the example of FIG. 3, the light guide 11 has a light receiving surface through which light from the light source 14B enters. The second light receiving surface through which light from the light source 14B enters is located in a second end portion 11B of the light guide 11 in the longitudinal direction, which is located opposite to the first end portion 11A, and may for example be an end face 11b of the light guide 11 in the longitudinal direction.

In the example of FIG. 2, the light guide 11 is held by the frame 4. However, the light guide 11 may get longer due to thermal expansion or the like. In order that the light guide 11 can be held by the frame 4 even when length of the light guide 11 (and in some cases length of the frame 4) in the longitudinal direction changes as described above, the first end portion 11A of the light guide 11 is not fixed to the frame 4 in the present embodiment. That is, the first end portion 11A of the light guide 11 is configured such that its position is movable in the X direction and movable relative to the frame 4 (or the circuit board 15) (i.e., relatively movable). The second end portion 11B of the light guide 11 may be fixed to the frame 4 or not fixed to the frame 4. In an embodiment, the light guide 11 is fixed to the frame 4 at a central portion of the light guide 11 in the longitudinal direction. In another embodiment, the light guide 11 is fixed to the frame 4 at the second end portion 11B of the light guide 11 in the longitudinal direction. In the present specification, an end portion of the light guide 11 in the longitudinal direction means a portion of the light guide 11 extending in the longitudinal direction from an end of the light guide 11 in the longitudinal direction and having a length equal to or shorter than 10% of the length of the light guide 11 in the longitudinal direction. The central portion of the light guide 11 means a portion of the light guide 11 that does not include a portion within a distance equal to or shorter than 10% of the length of the light guide 11 from ends of the light guide 11 in the longitudinal direction.

The light guide 11 further has an emitting surface 101 that extends in the longitudinal direction and through which light that passed through the light guide 11 exits. The light guide 11 also has a reflection surface 102 that is a surface extending in the longitudinal direction other than the emitting surface 101. Here, it is noted that the term "rod-like" indicates a shape extending in the longitudinal direction. Although the light guide 11 illustrated in FIG. 1 extends straight, the light guide 11 may be curved. Also, the rod-like light guide 11 is only required to include at least a portion having a rod-like shape.

As illustrated in FIGS. 1 and 2, a light guide cover 12 may be attached to the light guide 11. The light guide cover 12 has a shape extending in the longitudinal direction and is arranged to cover the reflection surface 102 of the light guide 11 along the longitudinal direction. The light guide cover 12 is not light transmissive. In an embodiment, the light guide cover 12 may be white in order to increase the amount of light directed toward the emitting surface 101. An example of materials of the light guide cover 12 such as above is polycarbonates containing titanium oxide. Alternatively, the light guide cover 12 may be black in order to prevent noise from being generated by light diffusely reflected at a surface of the light guide cover 12 and reaching the line sensor 3.

Light from the light source 14A that entered the light guide 11 through the light receiving surface is guided in the longitudinal direction while undergoing total reflection inside the light guide 11. Light that reached the reflection surface 102 undergoes total reflection or diffuse reflection. The light guide cover 12 is configured to cause diffuse reflection of light on the reflection surface 102 so that diffusely reflected light exits through the emitting surface 101. That is, the light guide cover 12 has a function of causing diffuse reflection of light that reached the reflection surface 102. At least a portion of diffusely reflected light is emitted through the light guide 11 and the emitting surface 101 to the outside. The emitting surface 101 may have a convex shape so that light that exited therefrom is concentrated on a linear irradiation region. Note that a diffuse reflection portion that causes diffuse reflection of light that reached there, such as a rough surface portion or a white painted portion may for example be provided as at least a portion of the reflection surface 102 in place of or in addition to the light guide cover 12.

The flexible wiring 16A is capable of supplying electricity from the circuit board 15 to the light source 14A. Also, the circuit board 15 is capable of supplying, to the light source 14A via the flexible wiring 16A, a signal for controlling light emission from the light source 14A. The configuration of the flexible wiring 16A is not particularly limited so long as the flexible wiring 16A is flexible and includes a wire that supplies electricity. For example, the flexible wiring 16A may be a cable or a flexible circuit board. In an example, a base material of the flexible wiring 16A is a resin such as polyimide or PET, and the flexible wiring 16A for example has a film-like shape. The flexible circuit board referred to in the present specification includes a flexible flat substrate and a wiring pattern formed on the flat substrate. In the case where the flexible wiring 16A is the flexible circuit board, the flexible wiring 16A may further include an electrical element. The illumination device 10 may further include the wiring 16B that supplies electricity or a control signal from the circuit board 15 to the light source 14B. The configuration of the wiring 16B may be similar to that of the flexible wiring 16A, but is not particularly limited.

In the present embodiment, the light source 14A is configured to be movable relative to the circuit board 15 (i.e., relatively movable). Also, the light source 14A is configured to be movable relative to the frame 4 holding the circuit board 15. By contrast, the light source 14A is fixed to the light guide 11 so that even when an end portion (for example, the end portion 11A) of the light guide 11 in the longitudinal direction moves in the X direction, fluctuation in the distance between the light source 14A and the light receiving surface of the light guide 11 can be reduced by movement of the position of the light source 14A in the X direction. In the present embodiment, the circuit board 15 and the light source 14A are connected by the flexible wiring 16A. Therefore, it is possible to cause the light source 14A to move relative to the circuit board 15 by providing a space that allows movement of the light source 14A to reduce fluctuation in the distance between the light source 14A and the light receiving surface of the light guide 11.

For example, it is possible to fix the light source 14A to the first end portion 11A of the light guide 11 in the longitudinal direction, and it is possible to provide a space away from the light guide 11 in the longitudinal direction, the space being adjacent to the light source 14A and the first end portion 11A. According to this configuration, even when the light guide 11 gets longer due to thermal expansion, it is possible to cause the light source 14A to move relative to the circuit board 15 while reducing fluctuation in the distance between the light source 14A and the light receiving surface of the light guide 11. According to this configuration, it is possible to cause the light source 14A to move so as to accompany elongation of the light guide 11. Similarly, even when the light guide 11 gets shorter due to thermal contraction, it is possible to cause the light source 14A to move relative to the circuit board 15 while reducing fluctuation in the distance between the light source 14A and the light receiving surface of the light guide 11.

Figure 4:
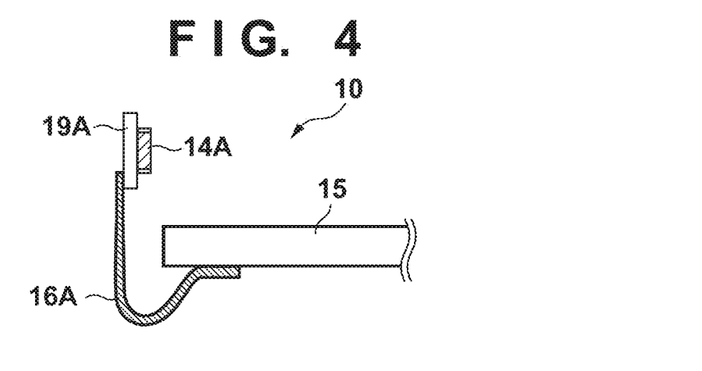
FIG. 4 is a schematic diagram of an illumination device according to an embodiment.

The following describes specific examples of methods for fixing the light source 14A to the light guide 11 with reference to FIGS. 3 and 4. FIG. 3 is a sectional view of the illumination device 10 taken along an X-Z plane passing through the center of the light guide 11. Note that the frame 4, the light guide cover 12, and the like are omitted. In an embodiment, the light source 14A is arranged on a light source substrate as illustrated in FIG. 3. The type of the light source substrate on which the light source 14A is arranged is not particularly limited, and the light source substrate may be a circuit board, for example, a printed circuit board, or a plate-like member to which the light source 14A is fixable. For example, the light source substrate may be the flexible circuit board 16A connected to the circuit board 15 as illustrated in FIG. 3. Alternatively, the light source substrate on which the light source 14A is arranged may be a rigid circuit board 19A as illustrated in FIG. 4. The rigid circuit board 19A may be connected to the circuit board 15 via a flexible wiring such as the flexible circuit board 16A. In this case too, the flexible wiring can supply electricity from the circuit board 15 to the light source 14A. Note that the light guide 11 is omitted in FIG. 4.

In the example of FIG. 3, the light source 14A is fixed on the light source substrate, and the first end portion 11A of the light guide 11 is also fixed to the light source substrate. In an embodiment, a surface of the light source substrate such as the flexible circuit board 16A is fixed to the first end face 11a located in the first end portion 11A of the light guide 11 in the longitudinal direction as illustrated in FIG. 3. The method for fixing the first end face 11a and the surface of the light source substrate is not particularly limited, and the first end face 11a and the surface of the light source substrate may be fixed together using a fixing member such as a bolt and a nut or a rivet, or an adhesive member such as an adhesive agent. In the example of FIG. 3, the first end face 11a and the surface of the flexible circuit board 16A are fixed together using rivets 17A.

In the example of FIG. 3, the first end portion 11A of the light guide 11 has a larger outer diameter than the central portion of the light guide 11. Also, the light guide 11 has a recessed portion 11aa in the end face 11a in the longitudinal direction. In this configuration, the first end face 11a and the light source substrate are fixed together using the rivets 17A, and the light source 14A is fixed between the first end face 11a and the light source substrate, i.e., inside the recessed portion 11aa. However, this configuration is merely an example. For example, the light source substrate may have a recessed portion that accommodates the light source 14A, in which case, the light source 14A can be fixed inside the recessed portion. Alternatively, the first end face 11*a* and the light source substrate may be connected with a hollow spacer located therebetween, in which case, the light source 14A can be fixed inside the spacer. In a configuration in which the light source 14A is accommodated in a closed space formed between the light source substrate and the first end face 11*a* as illustrated in FIG. 3, it is possible to reduce leakage of light from the light source 14A through a junction between the light source substrate and the first end face 11*a*. Therefore, it is possible to reduce fluctuation in the distribution of the amount of light from the illumination device 10.

In the example of FIG. 3, the illumination device 10 includes the additional light source 14B. The method for attaching the additional light source 14B is not particularly limited. For example, the light source 14B may be fixed to the light guide 11 in order to reduce fluctuation in the distance between the light source 14B and the second end face 11*b* through which light from the light source enters. For example, the light source 14B may be fixed to the light guide 11 in the same manner as the light source 14A. That is, the light source 14B can be fixed to the light guide 11 so that even when the end portion 11B of the light guide 11 in the longitudinal direction moves in the X direction, fluctuation in the distance between the light source 14B and the light receiving surface of the light guide 11 can be reduced by movement of the position of the light source 14B in the X direction. In the example of FIG. 3, the light source 14B is fixed to a light source substrate, which is the flexible circuit board 16B, similarly to the light source 14A. The flexible circuit board 16B is connected to the circuit board 15 and supplies electricity from the circuit board 15 to the light source 14B. The light source 14B is fixed inside a recessed portion 11*ba* in the second end face 11*b*, and the second end face 11*b* and the light source substrate which is the flexible circuit board 16B are fixed together using rivets 17B.

Alternatively, the light source 14B may be configured so as not to move relative to the circuit board 15 and the frame 4. For example, it is possible to fix the light source 14B to the light guide 11 and fix them to the frame 4.

In another example, the frame 4 can hold the light source 14B. In this case, the frame 4 can hold the light guide 11 in such a manner that when the light guide 11 gets longer, the first end portion 11A moves relative to the frame 4 and the second end portion 11B does not move relative to the frame 4. For example, the light source 14B and the second end portion 11B may be fixed to the frame 4. In a specific example, the light source substrate on which the light source 14B is arranged can be fixed in a slot in the frame 4. Also, the second end portion 11B can be fixed to the frame 4 that has a cutout 4*a* by inserting into the cutout 4*a* a protrusion 11BA of the second end portion 11B that has a shape complementary to the cutout 4*a* as illustrated in FIG. 1. In this configuration, when the light guide 11 gets longer due to thermal expansion, the first end portion 11A moves relative to the circuit board 15 (or the frame 4), but the second end portion 11B does not move relative to the circuit board 15 (or the frame 4). Therefore, it is possible to reduce fluctuation in the distance between the light source 14B and the second end face 11*b* of the second end portion 11B, which is the light receiving surface. Since the light source 14B does not move relative to the circuit board 15 (or the frame 4), it is not essential to connect the light source 14B and the circuit board 15 with a flexible wiring.

Figure 5:
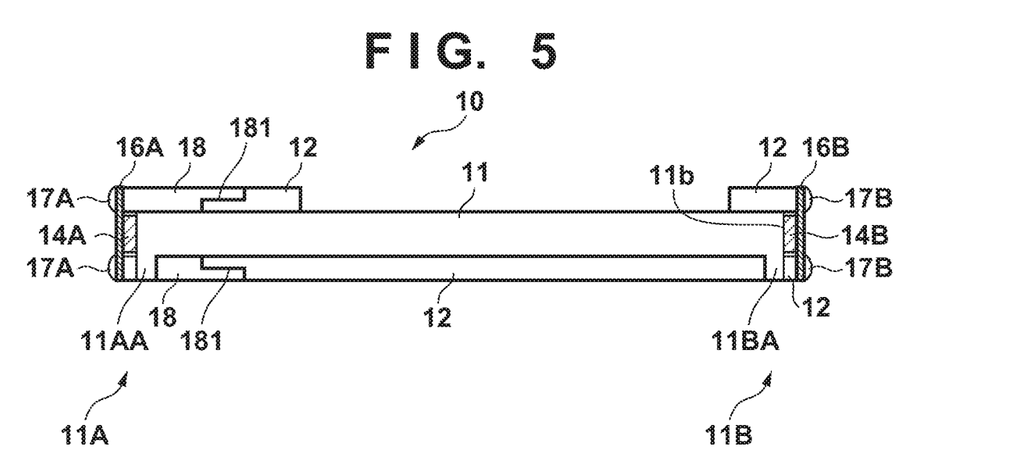
FIG. 5 is a schematic diagram of an illumination device according to an embodiment.

The following describes another example of specific arrangement relationship between the light source 14A and the light guide 11 with reference to FIG. 5. FIG. 5 is a sectional view of the illumination device 10 taken along an X-Y plane passing through the center of the light guide 11. Note that the frame 4 and the like are omitted. The light source 14A can be arranged on a light source substrate such as the flexible circuit board 16A or the rigid circuit board 19A as in FIGS. 3 and 4. In the example of FIG. 5, the light source 14A is arranged on the flexible circuit board 16A. In the example of FIG. 5, a support member 18 is fixed to the first end portion 11A of the light guide 11 in the longitudinal direction. The support member 18 is fixed to the light source substrate. Thus, the first end portion 11A can be fixed to the light source substrate by means of the support member 18.

Although the shape of the support member 18 is not particularly limited so long as the support member 18 can fix the first end portion 11A to the light source substrate, the support member 18 in an embodiment is a hollow cylindrical member surrounding the first end portion 11A in a circumferential direction. The method for fixing the light source substrate to the support member 18 is not particularly limited, and the light source substrate and the support member 18 may be fixed together using a fixing member such as a bolt and a nut or a rivet, or an adhesive member such as an adhesive agent. In the example of FIG. 5, the first end face 11*a* and a surface of the flexible circuit board 16A are fixed together using rivets 17A. Also, the method for fixing the support member 18 and the first end portion 11A is not particularly limited, and the support member 18 and the first end portion 11A may be fixed together using a fixing member or an adhesive member, or by engaging the support member 18 and the first end portion 11A. In the example of FIG. 5, the first end portion 11A and the support member 18 are fixed together by engaging a protrusion 11AA of the first end portion 11A with an opening in the support member 18. The protrusion 11AA can be provided on a surface other than the emitting surface 101, for example, on the reflection surface 102, in order to reduce leakage of light to the outside through the protrusion 11AA.

In the above configuration, the light source 14A can be arranged inside the support member 18 and between the light source substrate such as the flexible circuit board 16A and the first end face 11*a* that is the light receiving surface for light from the light source 14A. In the example of FIG. 5, the light source 14A is accommodated in a closed space formed between the flexible circuit board 16A, the first end portion 11A, and the support member 18, whereby leakage of light from the space is reduced.

The configuration illustrated in FIG. 5 can be used in combination with the light guide cover 12. In an embodiment, the illumination device 10 includes the light guide cover 12 that covers a side surface of the light guide 11 along the longitudinal direction. The light guide cover 12 is attached to the light guide 11, but is configured to allow elongation of the light guide 11. For example, the light guide cover 12 may have holes in respective opposite end portions in the longitudinal direction, and the light guide 11 may be inserted through the holes as illustrated in FIG. 5. According to this configuration, even if the light guide cover 12 is fixed to the frame 4 via protrusions 121 as illustrated in FIG. 1 the position of the first end portion 11A moves in the X direction when the light guide 11 gets longer, which means that the first end portion 11A is movable relative to the frame 4 (or the circuit board 15). Meanwhile, a portion of the light guide 11 protruding from the light guide cover 12 may get longer due to elongation of the light guide 11 since the first end portion 11A is not fixed to the light guide cover 12 in the configuration illustrated in FIG. 5.

In an embodiment, an end portion of the light guide cover 12 and an end portion of the support member 18 overlap each other in the longitudinal direction of the light guide 11. According to this configuration, even when the portion of the light guide 11 protruding from the light guide cover 12 gets longer, the portion is covered by the support member 18 that moves in the X direction. Therefore, even when the light guide 11 gets longer due to thermal expansion or the like, it is possible to reduce fluctuation in the distribution of the amount of light from the illumination device 10 since the position of the light source 14A moves in the X direction and leakage of light through a site between the support member 18 and the light guide cover 12 can be reduced. The end portion of the light guide cover 12 and the end portion of the support member 18 may engage with each other as illustrated in FIG. 5. In the example of FIG. 5, the end portion of the support member 18 covers the end portion of the light guide cover 12. However, the end portion of the light guide cover 12 may cover the end portion of the support member 18. In the example of FIG. 5, the support member 18 has a contact surface 181 in contact with the end portion of the light guide cover 12, and the contact surface 181 extends in the circumferential direction of the light guide 11 and is parallel to the longitudinal direction of the light guide 11. According to this configuration, leakage of light from a site between the support member 18 and the light guide cover 12 is further reduced when the light guide 11 gets longer.

In an embodiment, the end portion of the light guide cover 12 and the end portion of the support member 18 that overlap each other in the longitudinal direction of the light guide 11 both cover at least the emitting surface 101 of the light guide 11. In another embodiment, the end portion of the light guide cover 12 and the end portion of the support member 18 that overlap each other in the longitudinal direction of the light guide 11 both cover the entire circumference of the light guide 11. According to this configuration, it is possible to reduce the leakage of intense light from the light source 14 in the vicinity of the light source 14 when the light guide 11 gets longer.

In the case in which the illumination device 10 includes the light source 14B in the above embodiment, the method for attaching the light source 14B is not particularly limited. As illustrated in FIG. 5, the light guide cover 12 can be fixed to a light source substrate such as the flexible circuit board 16B with the light source 14B arranged thereon using a fixing member such as rivets 17B or the like. Also, the second end portion 11B and the light guide cover 12 can be fixed together by for example engaging the protrusion 11BA of the second end portion 11B with an opening in the light guide cover 12. As described above, the light source 14B can be fixed to the second end portion 11B of the light guide 11 using the light guide cover 12 as a support member.

In the example of FIG. 5, the light source 14B is arranged inside the light guide cover 12 and between the light source substrate such as the flexible circuit board 16B and the second end face 11b that is the light receiving surface for light from the light source 14B. In the example of FIG. 5, the light source 14B is accommodated in a closed space formed between the flexible circuit board 16B, the second end portion 11B, and the light guide cover 12, whereby leakage of light from the space is reduced.

By contrast, the second end portion 11B may be fixed in contact with a surface of the light source substrate as in FIG. 3. Also, as already described, the light source 14B may be configured so as not to move relative to the circuit board 15 and the frame 4. For example, the light source 14B and the second end portion 11B may be fixed to the frame 4. For example, the light source 14B and the second end portion 11B can be fixed to the frame 4 via the light guide cover 12 as illustrated in FIG. 1.

The line sensor assembly 1 can be used in a reading apparatus 7. The reading apparatus 7 according to an embodiment of the present invention includes the line sensor assembly 1 and an output unit that outputs read data obtained by the line sensor assembly 1. The output unit can be arranged for example on the circuit board 15 and is capable of receiving, as the read data, a signal from the line sensor 3 that corresponds to a light detection result and outputting the read data to the outside after performing signal processing as necessary.

Figure 6:
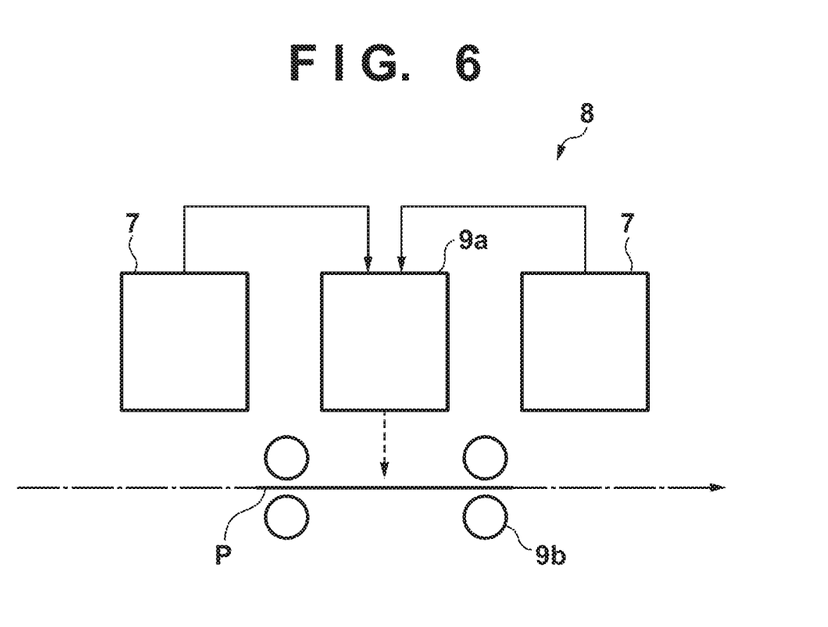
FIG. 6 is a diagram illustrating a functional configuration of a printing apparatus that includes a reading apparatus according to an embodiment.

The above-described reading apparatus 7 can be used as a constituent element of a printing apparatus. FIG. 6 is a diagram schematically illustrating a configuration of a printing apparatus 8 according to an embodiment of the present invention. The printing apparatus 8 includes the reading apparatus 7 that reads a medium, a printing unit 9a that performs printing on a medium based on a result of reading by the reading apparatus 7, and a conveyance unit 9b that conveys a medium.

The printing unit 9a is capable of printing a character, an image, or the like on a medium P (for example, paper) by any method such as an inkjet method or an electrophotographic method. A conveyance roller that conveys a medium from upstream to downstream can be used as the conveyance unit 9b. In an embodiment, the printing apparatus 8 is capable of performing copying processing, in which case, the printing unit 9a prints an image read by the reading apparatus 7 on the medium. In an embodiment, the printing apparatus 8 is capable of performing feedback control. For example, the reading apparatus 7 is capable of reading a medium on which printing was performed by the printing unit 9a and transmitting read data to the printing unit 9a. Based on the read data, the printing unit 9a can check the condition of printing performed on the medium and control a printing parameter for when printing is performed next.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-233614, filed Dec. 5, 2017 and Japanese Patent Application No. 2018-215757, filed Nov. 16, 2018, which are hereby incorporated by reference herein in their entirety.

What is claimed is:
1. An illumination device comprising:
a circuit board;
a light source movable relative to the circuit board;
a rod-like light guide that guides light from the light source and that is elongated in a longitudinal direction, the light guide having a light receiving surface through which light from the light source enters;
a flexible wiring that supplies electricity from the circuit board to the light source; and
a frame that holds the light guide and the circuit board such that the light source is movable relative to the frame in the longitudinal direction and such that the light source moves in the longitudinal direction to reduce fluctuation in distance between the light source and the light receiving surface of the light guide when the light receiving surface moves in the longitudinal direction.

2. The illumination device according to claim 1, wherein the light source is arranged on a light source substrate.

3. The illumination device according to claim 2, wherein a surface of the light source substrate is fixed to an end face of the light guide in the longitudinal direction.

4. The illumination device according to claim 3, wherein the light guide has a recessed portion in the end face in the longitudinal direction, and the light source is fixed inside the recessed portion.

5. The illumination device according to claim 2, further comprising
a support member fixed to an end portion of the light guide in the longitudinal direction,
wherein the support member is fixed to the light source substrate.

6. The illumination device according to claim 5, further comprising
a light guide cover that covers a side surface of the light guide,
wherein an end portion of the light guide cover and an end portion of the support member overlap each other in the longitudinal direction.

7. The illumination device according to claim 2, wherein the light source substrate is a flexible circuit board that is connected to the circuit board and that serves as the flexible wiring.

8. The illumination device according to claim 1,
wherein the light guide is fixed to the frame at a central portion of the light guide in the longitudinal direction or at a second end portion of the light guide in the longitudinal direction to allow movement of the light source relative to the frame, the second end portion being located opposite to the first end portion.

9. The illumination device according to claim 1, further comprising
an additional light source,
wherein the light guide has a first light receiving surface through which light from the light source enters and a second light receiving surface through which light from the additional light source enters, the first light receiving surface being located in a first end portion of the light guide in the longitudinal direction, and the second light receiving surface being located in a second end portion of the light guide in the longitudinal direction,
the light source is capable of moving in the longitudinal direction to reduce fluctuation in distance between the light source and the first light receiving surface when an end portion of the light guide in the longitudinal direction moves in the longitudinal direction, and
the additional light source is capable of moving in the longitudinal direction to reduce fluctuation in distance between the additional light source and the second light receiving surface when an end portion of the light guide in the longitudinal direction moves in the longitudinal direction.

10. A line sensor assembly comprising:
the illumination device according to claim 1;
a lens array configured to collect light emitted from the illumination device toward a reading target; and
a line sensor configured to detect light collected by the lens array.

11. A reading apparatus comprising:
the line sensor assembly according to claim 10; and
outputting unit configured to output read data obtained by the line sensor assembly.

12. A printing apparatus comprising:
the reading apparatus according to claim 11 configured to read a first medium;
a printing unit configured to perform printing on a second medium based on a result of reading by the reading apparatus; and
a conveying unit configured to convey the second medium.

13. The illumination device according to claim 1, wherein the frame holds the light guide such that the light source moves in the longitudinal direction to reduce fluctuation in distance between the light source and the light receiving surface of the light guide in response to the light guide getting longer due to thermal expansion.

14. An illumination device comprising:
a circuit board;
a light source movable relative to the circuit board;
an additional light source movable relative to the circuit board;
a rod-like light guide that guides light from the light source and that is elongated in a longitudinal direction; and
a flexible wiring that supplies electricity from the circuit board to the light source,
wherein the light guide has a first light receiving surface through which light from the light source enters and a second light receiving surface through which light from the additional light source enters, the first light receiving surface being located in a first end portion of the light guide in the longitudinal direction, and the second light receiving surface being located in a second end portion of the light guide in the longitudinal direction.

15. The illumination device according to claim 14, further comprising a frame that holds the light guide and the circuit board, wherein
the light source is held by the frame such that the light source is movable relative to the frame in the longitudinal direction and such that the light source moves in the longitudinal direction to reduce fluctuation in distance between the light source and the first light receiving surface of the light guide when the first light receiving surface moves in the longitudinal direction; and
the additional light source is held by the frame such that the additional light source is movable relative to the frame in the longitudinal direction and such that the additional light source moves in the longitudinal direction to reduce fluctuation in distance between the additional light source and the second light receiving surface of the light guide when the second light receiving surface moves in the longitudinal direction.

16. A line sensor assembly comprising:
the illumination device according to claim 14;
a lens array configured to collect light emitted from the illumination device toward a reading target; and
a line sensor configured to detect light collected by the lens array.

17. A reading apparatus comprising:
the line sensor assembly according to claim 16; and
an outputting unit configured to output read data obtained by the line sensor assembly.

18. A printing apparatus comprising:
the reading apparatus according to claim 17 configured to read a first medium;

a printing unit configured to perform printing on a second medium based on a result of reading by the reading apparatus; and a conveying unit configured to convey the second medium.

\* \* \* \* \*